US012601306B2

(12) United States Patent
Sumita et al.

(10) Patent No.: US 12,601,306 B2
(45) Date of Patent: Apr. 14, 2026

(54) CONTROL APPARATUS FOR ENGINE

(71) Applicant: Mazda Motor Corporation, Hiroshima (JP)

(72) Inventors: Masataka Sumita, Aki-gun (JP); Kouichi Miyamoto, Aki-gun (JP); Kouji Shishime, Aki-gun (JP); Kenichi Ogasawara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 47 days.

(21) Appl. No.: 18/947,019

(22) Filed: Nov. 14, 2024

(65) Prior Publication Data

US 2025/0172099 A1 May 29, 2025

(30) Foreign Application Priority Data

Nov. 27, 2023 (JP) ................................ 2023-199665

(51) Int. Cl.
*F02D 41/06* (2006.01)
*F02D 33/02* (2006.01)
*F02D 41/00* (2006.01)

(52) U.S. Cl.
CPC ......... *F02D 41/0002* (2013.01); *F02D 33/02* (2013.01); *F02D 41/064* (2013.01)

(58) Field of Classification Search
CPC .... F02D 41/0002; F02D 33/02; F02D 41/064; F02D 41/068; F02D 2200/03; F02D 41/2422
See application file for complete search history.

(56) References Cited

U.S. PATENT DOCUMENTS 11,105,288 B1 * 8/2021 Yohannes ........... F02D 41/0002
2004/0112331 A1 * 6/2004 Miura .................. F02D 41/006 123/568.14
2009/0112448 A1 * 4/2009 Kawamura ......... F02D 41/0002 701/110

FOREIGN PATENT DOCUMENTS

JP 2013-072285 A 4/2013

* cited by examiner

*Primary Examiner* — Syed O Hasan
(74) *Attorney, Agent, or Firm* — XSENSUS LLP

(57) ABSTRACT

A control system for an engine includes: a valve that adjusts an intake air filling amount for a cylinder according to an operation amount of an accelerator pedal; a sensor that outputs a measurement signal related to a temperature of an upper end of a cylinder head having an intake port and an exhaust port communicating with the cylinder; and a control circuit that sets an upper limit value of the intake air filling amount to be smaller as the temperature of the upper end of the cylinder head is reduced base on the measurement signal at the start of an engine, and outputs, to the valve, a control signal corresponding to the operation amount of the accelerator pedal within a range where the intake air filling amount does not exceed the upper limit value.

16 Claims, 9 Drawing Sheets

CONTROL APPARATUS FOR ENGINE

CROSS-REFERENCE TO RELATED APPLICATION

The present application claims priority to Japanese application number 2023-199665 filed in the Japanese Patent Office on Nov. 27, 2023, the entire contents of which are incorporated herein by reference.

TECHNICAL FIELD

A technique disclosed herein relates to a control apparatus for engine.

BACKGROUND ART

A conventional cooler for an internal combustion engine is described in Patent Literature 1. The cooler includes: a distortion sensor that detects distortion of an engine block; and cooling means for controlling circulation of cooling water in a cooling passage within the engine block. The cooling means circulates the cooling water so that a distortion amount detected by the distortion sensor becomes equal to or smaller than a predetermined value. In detail, when the detected distortion amount exceeds the predetermined value, a rotational speed of an electric water pump is increased, and a flow rate of the cooling water is thereby increased.

CITATION LIST

Patent Literature

[Patent Literature 1] JP2013-72285A

SUMMARY

Technical Problems

By the way, thermal distortion that occurs to the engine is caused by a temperature difference between a high-temperature portion having a high temperature and a low-temperature portion having a low temperature. A large temperature difference makes a deformation amount of the engine non-uniform, and the distortion is increased as non-uniformity of a deformation amount is increased.

For example, such a case is considered where the engine is started in environment where an outside air temperature falls below minus 20° C., and a throttle valve is fully opened for travel by depression of an accelerator pedal immediately after the start. In this case, such a situation possibly occurs where temperatures of positions of an exhaust port formed in a cylinder head of the engine and an exhaust manifold are increased locally and rapidly while a temperature of a position away from a portion on an exhaust side of the cylinder head, such as the vicinity of an upper end of the cylinder head, remains lower than the extremely low outside air temperature. In this case, the cylinder head is possibly distorted significantly due to a large temperature difference.

The conventional cooler adjusts the flow rate of the cooling water. However, since a thermostat valve is closed, the cooling water does not flow through the engine immediately after the start of the engine. For this reason, the portion on the exhaust side of the cylinder head is not cooled. Even in the case where the cooling water flows through the engine, no further cooling effect can be expected when a temperature of the cooling water reaches 100° C.

The above-described conventional cooler has a low effect of suppressing the temperature difference in the engine that possibly occurs immediately after the engine start described above.

A technique disclosed herein suppresses occurrence of significant distortion in an engine due to a large temperature difference in the engine.

Solutions to Problems

The technique disclosed herein relates to a control apparatus for an engine. This control apparatus for an engine includes:

- an adjustment unit for adjusting an intake air filling amount for a cylinder according to an operation amount of an accelerator pedal;
- a measurement unit for outputting a measurement signal related to a temperature of an upper end of a cylinder head having an intake port and an exhaust port communicating with the cylinder; and
- a control unit for setting an upper limit value of the intake air filling amount to be smaller as the temperature of the upper end of the cylinder head is reduced on the basis of the measurement signal of the measurement unit at a start of the engine when the temperature of the upper end of the cylinder head is equal to or lower than a predetermined temperature, and outputting, to the adjustment unit, a control signal corresponding to the operation amount of the accelerator pedal within a range where the intake air filling amount does not exceed the upper limit value.

The measurement unit outputs the measurement signal related to the temperature of the upper end of the cylinder head. The upper end of the cylinder head is located away from the exhaust port of the cylinder head. A temperature difference between the temperature of the upper end of the cylinder head and a temperature near the exhaust port tends to be large. The exhaust port is a port communicating with the cylinder to discharge burnt gas in the cylinder from the cylinder. The cylinder head may have an exhaust manifold in which a plurality of the exhaust ports are assembled.

The control unit outputs the control signal corresponding to the operation amount of the accelerator pedal to the adjustment unit. The adjustment unit adjusts the intake air filling amount for the cylinder according to the control signal. When the operation amount of the accelerator pedal is large, the adjustment unit increases the intake air filling amount for the cylinder. As the intake air filling amount is increased, output of the engine is increased, and the temperature near the exhaust port of the cylinder head is also increased. The adjustment unit may be a throttle valve located in the middle of an intake pipe communicating with the cylinder. Alternatively, the adjustment unit may be an intake valve and/or an exhaust valve that opens/closes the intake port and/or the exhaust port.

The control unit also sets the upper limit value of the intake air filling amount to be small according to the temperature of the upper end of the cylinder head, which is the temperature at the start of the engine. More specifically, when the temperature of the upper end of the cylinder head at the start of the engine is equal to or lower than the predetermined temperature, the control unit sets the upper limit value of the intake air filling amount to be smaller as the temperature of the upper end of the cylinder head is reduced. The predetermined temperature may be a temperature below a freezing point, for example.

Here, the start of the engine is a start by a driver who has entered an automobile operating a starter switch, and in general, a temperature of the engine at the start is substantially equal to an outside air temperature.

The control unit further outputs, to the adjustment unit, the control signal corresponding to the operation amount of the accelerator pedal on the basis of the set upper limit value of the intake air filling amount within the range where the intake air filling amount does not exceed the upper limit value. Even when the driver depresses the accelerator pedal significantly, the intake air filling amount is limited by the upper limit value. The output of the engine is suppressed, and an increase in temperature near the exhaust port of the cylinder head is also suppressed. As a result, an increase in the temperature difference in the engine, in particular, the cylinder head is suppressed, and thus significant distortion of the cylinder head is suppressed.

Here, unlike the control apparatus described above, such control is considered that, after the temperature difference between the temperature of the upper end of the cylinder head and the temperature near the exhaust port is increased during the operation of the engine, the upper limit value of the intake air filling amount is set to limit the intake air filling amount. In this case, the temperature difference between the temperature of the upper end of the cylinder head and the temperature near the exhaust port is not large immediately after the start of the engine. Thus, while the intake air filling amount is not substantially limited, the temperature difference between the temperature of the upper end of the cylinder head and the temperature near the exhaust port is increased as the temperature near the exhaust port is increased after the start of the engine. As a result, the intake air filling amount is limited by the set upper limit value. Such control limits the output of the engine as the temperature of the engine is increased, resulting in a sense of discomfort to the driver.

On the other hand, the control apparatus sets the upper limit value of the intake air filling amount in advance according to the temperature of the upper end of the cylinder head at the start of the engine, in other words, before the temperature difference between the temperature of the upper end of the cylinder head and the temperature near the exhaust port is increased, thereby limiting the intake air filling amount. This control can prevent the above-described sense of discomfort to the driver.

Furthermore, the control apparatus does not suppress the distortion of the engine by increasing cooling capacity of the engine. Immediately after the start of the engine, the temperature difference in the engine can be effectively suppressed.

When the temperature of the upper end of the cylinder head at the start of the engine exceeds the predetermined temperature, the control unit may not set the upper limit value of the intake air filling amount. Here, the upper limit value is an upper limit value for suppressing the distortion of the engine, and is not an upper limit value of the intake air filling amount for setting maximum output in the specifications of the engine. In other words, the above-described upper limit value of the intake air filling amount is smaller than the upper limit value of the intake air filling amount for setting the maximum output in the specifications of the engine.

The cylinder head may have a lubricating oil passage at the upper end of the cylinder head, and the measurement unit may be attached to the engine and output a measurement signal related to a temperature of the lubricating oil to the control unit.

According to studies conducted by the inventors of the present application, in the engine having the lubricating oil passage at the upper end of the cylinder head, it was found that there was a high correlation between the temperature of the lubricating oil and the temperature of the upper end of the cylinder head. Using the measurement unit that outputs the measurement signal related to the temperature of the lubricating oil, that is, a so-called oil temperature sensor, the control apparatus suppresses the distortion of the engine described above. The control apparatus does not require any special sensors.

The control unit may set an upper limit value qa_limit of the intake air filling amount according to the following Relational Expression (1).

$$\text{qa\_limit} = A \times \text{Toil} + B \times \varepsilon\_\text{a} + C \tag{1}$$

Here, Toil is the temperature of the lubricating oil, ε_a is an allowable value of the distortion of the cylinder head, and A, B, and C are constants.

According to studies by the inventors of the present application, it was found that the temperature difference ΔT between the temperature of the upper end of the cylinder head and the temperature near the exhaust port during the operation of the engine and the distortion magnitude ε that occurred to the cylinder head had a linear relationship as shown in Equation (2).

$$\varepsilon = \{\text{temperature near the exhaust port } (qa, thw) - \text{temperature at the upper end of the cylinder head (Toil, } thw, qa)\} \times a + f(qa) \tag{2}$$

Here, qa is the intake air filling amount, thw is a cooling water temperature in the engine, and a is a constant. The intake air filling amount qa and the cooling water thw of the engine are influence factors of the temperature near the exhaust port. The temperature Toil of the lubricating oil, the intake air filling amount qa, and the cooling water thw of the engine are influences of the temperature of the upper end portion of the cylinder head. Note that the temperature difference ΔT is expressed by the following equation, $$\Delta T = \{\text{temperature near the exhaust port } (qa, thw) - \text{temperature at the upper end of the cylinder head (Toil, } thw, qa)\}.$$

In order to suppress the distortion of the cylinder head to be equal to or less than the allowable value even in a state where the cooling water temperature reaches a maximum temperature, such as 100° C., the maximum temperature and the allowable value ε_a of the distortion are respectively plugged in for thw and c in Expression (2). As a result, as in Equation (1), the upper limit value qa_limit of the intake air filling amount can be expressed by the temperature Toil of the lubricating oil. Equation (1) is an equation obtained from Model Equation (2) for predicting the distortion occurring in the cylinder head.

According to Equation (1), in the case where the temperature Toil of the lubricating oil is increased as the operation of the engine continues after the start of the engine, the upper limit value qa_limit of the intake air filling amount is increased. The limitation on the intake air filling amount when the driver depresses the accelerator pedal is relaxed. The output of the engine is relatively increased.

When the temperature Toil of the lubricating oil is high, the temperature of the upper end of the cylinder head is high. Thus, even when the output of the engine is increased, and the temperature near the exhaust port is increased, the temperature difference between the temperature near the exhaust port and the temperature in the upper end of the cylinder head is small. Since the temperature difference in the cylinder heads is small, the distortion of the engine is suppressed.

The control unit may have a table showing a relationship between the temperature of the upper end of the cylinder head at the start of the engine and the upper limit value of the intake air filling amount,

- the control unit may set a first upper limit value of the intake air filling amount on the basis of the measurement signal of the measurement unit by using the table at the start of the engine, and may output a control signal corresponding to the operation amount of the accelerator pedal within a range where the intake air filling amount does not exceed the first upper limit value, and
- the control unit may calculate a second upper limit value of the intake air filling amount by using the relational expression after the start of the engine, and may output, to the adjustment unit, a control signal corresponding to the operation amount of the accelerator pedal within a range where the intake air filling amount does not exceed the second upper limit value after the second upper limit value exceeds the first upper limit value.

As described above, Equation (1) is the equation obtained by plugging in the maximum temperature for the cooling water temperature thw of the engine in Equation (2). The actual cooling water temperature at the start of the engine is lower than the maximum temperature. Therefore, the upper limit value of the intake air filling amount calculated by using Equation (1) may be too small in consideration of the actual cooling water temperature immediately after the start of the engine. When the upper limit value is used immediately after the start of the engine, the output of the engine may be unnecessarily limited.

Therefore, when the engine is started, the control unit sets the first upper limit value of the intake air filling amount by using the table. The table shows the relationship between the temperature of the upper end of the cylinder head and the upper limit value of the intake air filling amount when the engine is started. The table may be created on the basis of pre-performed experiments. Immediately after the start of the engine, the adjustment unit is controlled according to the first upper limit value of the intake air filling amount set by using the table, and therefore, the distortion of the engine is suppressed from exceeding the allowable value without unnecessarily limiting the output of the engine.

Further, after the engine is started, the cooling water temperature in the engine is increased as the operation of the engine continues. As a result, the second upper limit value of the intake air filling amount calculated by using Equation (1) is effective for suppressing the distortion of the engine. After the second upper limit value exceeds the first upper limit value, the control unit outputs, to the adjustment unit, the control signal corresponding to the operation amount of the accelerator pedal within the range where the intake air filling amount does not exceed the second upper limit value set according to Expression (1). The control apparatus for the engine can reduce the output limit of the engine as much as possible while suppressing the distortion of the engine from exceeding the allowable value. As warm-up of the engine progresses, the output of the engine approaches output requested by the driver.

Advantageous Effects

The control apparatus for the engine can suppress occurrence of the significant distortion in the engine by suppressing the increase in the temperature difference of the engine.

DESCRIPTION OF EMBODIMENTS

Hereinafter, an embodiment of a control apparatus for an engine will be described with reference to the drawings. The control apparatus for the engine described herein is an example.

(Overall Structure of Control Apparatus for Engine)

Figure 1:
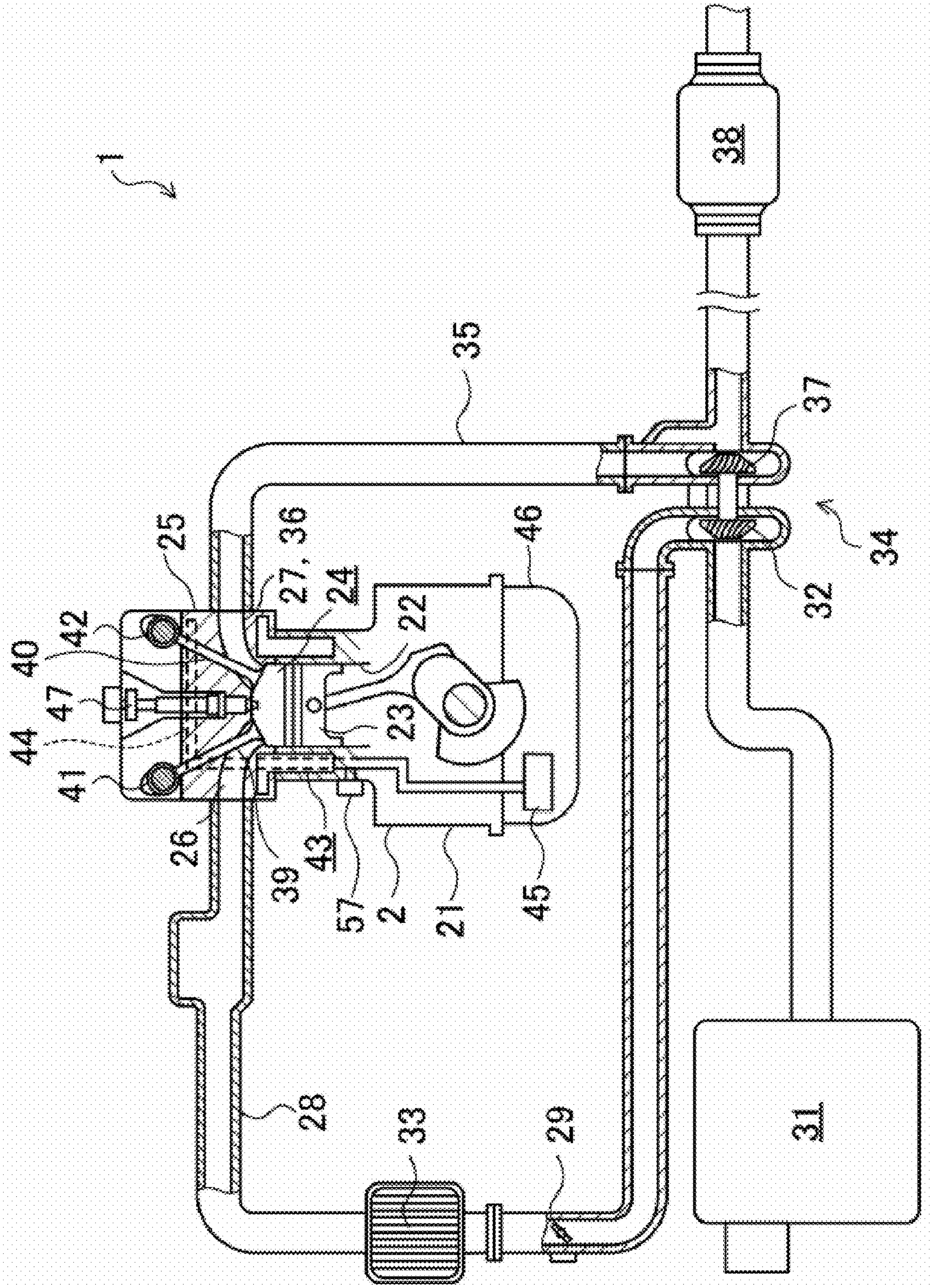
FIG. 1 shows a control apparatus for an engine.
Figure 2:
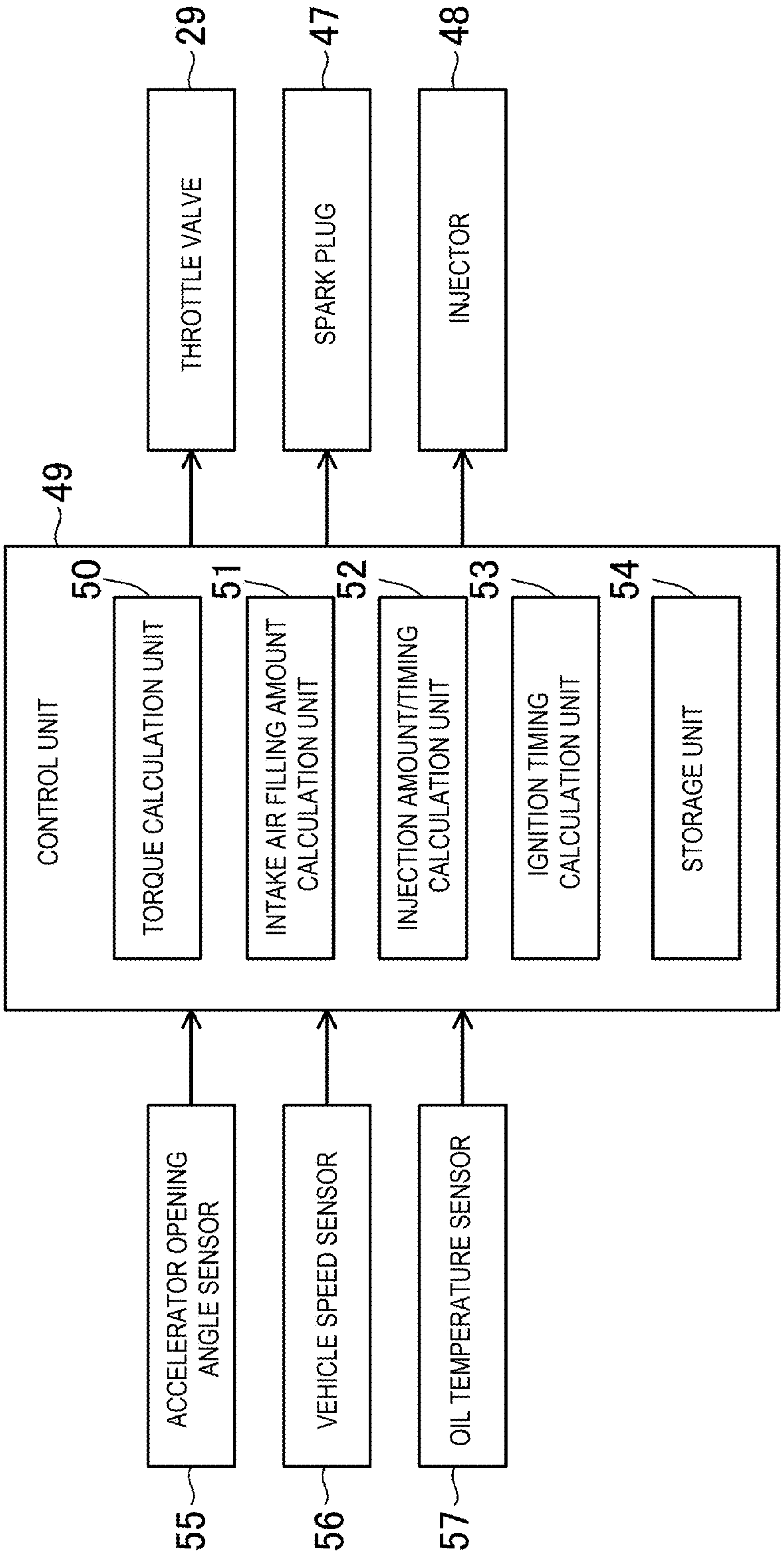
FIG. 2 is a block diagram of the control apparatus for the engine.
Figure 3:
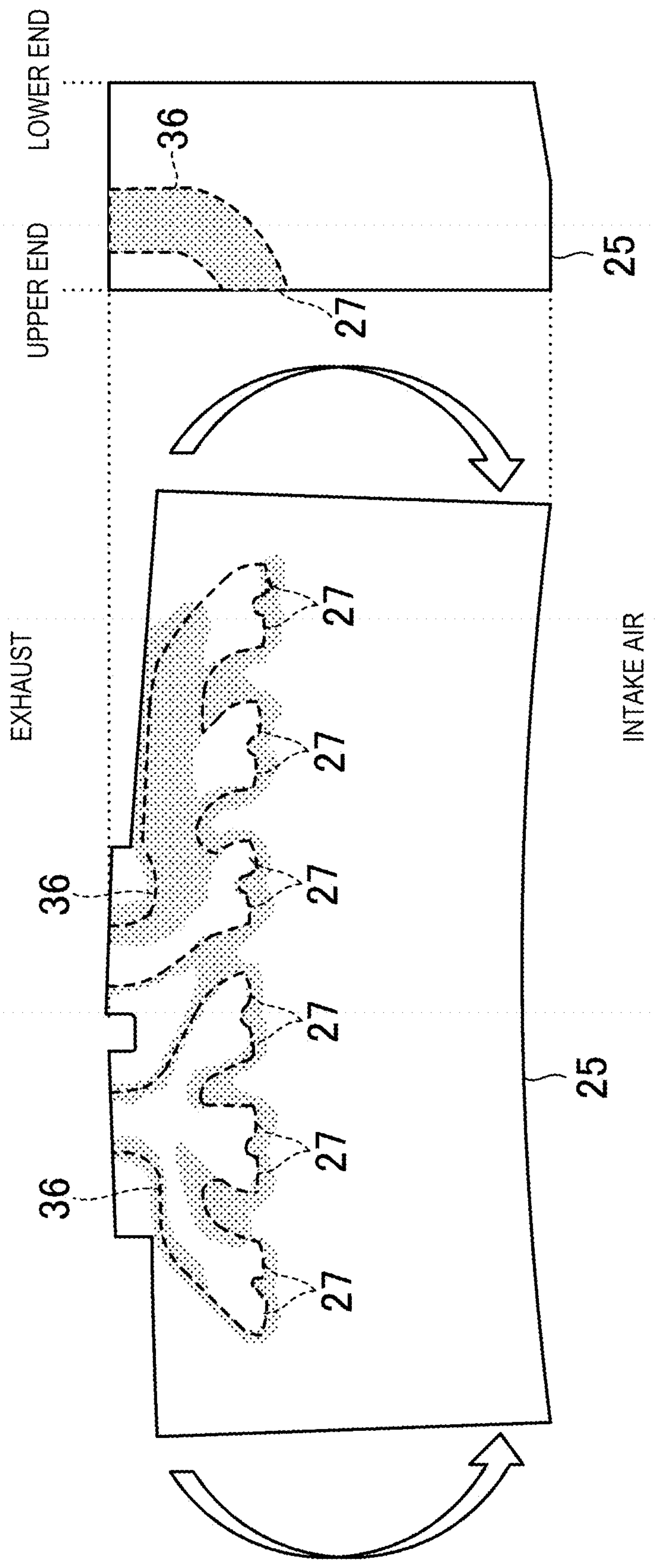
FIG. 3 illustrates views showing distortion that occurs to a cylinder head, in which a left view of FIG. 3 is a plan view of the cylinder head, and a right view thereof is a side view of the cylinder head.

FIG. 1 shows a control apparatus 1 for the engine. FIG. 2 is a block diagram of the control apparatus for the engine. FIG. 3 shows a cylinder head of the engine. The control apparatus 1 for the engine is mounted on a four-wheeled automobile.

The control apparatus 1 for the engine includes an engine 2. The engine 2 is a traveling drive source of the automobile. The engine 2 is, for example, a spark ignition type engine. The engine 2 may be a compression ignition type engine.

The engine 2 includes a cylinder block 21. The cylinder block 21 includes a cylinder 22. Although only one is illustrated in FIG. 1, the engine 2 includes a plurality of the cylinders 22. The cylinder 22 forms a combustion chamber 24 with a piston 23 inserted in the cylinder 22. The piston 23 reciprocates in the cylinder 22.

The engine 2 includes a cylinder head 25. The cylinder head 25 is located on top of the cylinder block 21 and closes an upper end opening of the cylinder 22. The cylinder head 25 has an intake port 26 and an exhaust port 27.

The intake port 26 connects an intake pipe 28 and a cylinder 22. The intake pipe 28 delivers intake air to the cylinder 22. A throttle valve 29 is located in the middle of the intake pipe 28. The throttle valve 29 is a butterfly valve and adjusts an intake air filling amount for the cylinder 22 by adjusting an opening angle thereof. The throttle valve 29 is an example of an adjustment unit.

Reference numeral 31 denotes an air cleaner 31. The air cleaner 31 is located at a tip of the intake pipe 28 and removes dust from the air to be supplied into the cylinder 22.

Reference numeral 32 denotes a compressor 32 of a turbocharger 34. The compressor 32 compresses the air to be supplied into the cylinder 22. Reference numeral 33 denotes an intercooler that cools the air compressed by the compressor 32.

The exhaust port 27 is connected to the cylinder 22. As shown in FIG. 3, the cylinder head 25 includes an exhaust manifold 36. The exhaust manifold 36 collects a plurality of the exhaust ports 27. The exhaust manifold 36 is connected to an exhaust pipe 35. The exhaust pipe 35 discharges exhaust gas from the cylinder 22.

Reference numeral 37 denotes a turbine 37 of the turbocharger 34. The turbine 37 rotates using energy of the exhaust gas discharged from the cylinder 22. The turbine 37 is connected to the compressor 32, and the turbine 37 and the compressor 32 rotate together. Reference numeral 38 denotes a catalytic converter 38. The catalytic converter 38 purifies the exhaust gas.

The engine 2 has an intake valve 39. The intake valve 39 opens/closes the intake port 26 at predetermined timing. The engine 2 includes an exhaust valve 40. The exhaust valve 40 opens/closes the exhaust port 27 at predetermined timing. Camshafts 41, 42 located at an upper end of the cylinder head 25 move the intake valve 39 and the exhaust valve 40, respectively.

The engine 2 includes a spark plug 47. A tip of the spark plug 47 faces the inside of the cylinder 22. The spark plug 47 forcibly ignites air-fuel mixture in the cylinder 22.

The engine 2 includes an injector 48 (see FIG. 2). The injector 48 supplies fuel into the cylinder 22.

The engine 2 has a cooling water passage 43. The cooling water passage 43 is formed in the cylinder block 21 and the cylinder head 25. Cooling water flows through the cooling water passage 43. The cooling water cools the periphery of the cylinder 22 and an exhaust side of the engine 2, that is, a right side of the sheet in FIG. 1.

The engine 2 includes an oil gallery 44. The oil gallery 44 is connected to an oil pump 45. The oil pump 45 is immersed in lubricating oil stored in an oil pan 46. The oil pump 45 supplies the lubricating oil to the engine 2 through the oil gallery 44. In detail, the oil gallery 44 runs from the oil pan 46 to the cylinder head 25 through the cylinder block 21. The oil gallery 44 also extends to the upper end of the cylinder head 25 and can supply the lubricating oil to the camshafts 41, 42. That is, the cylinder head 25 has the passage for the lubricating oil at the upper end of the cylinder head 25. The lubricating oil supplied to the engine 2 returns to the oil pan 46 while being supplied to the respective locations in the engine 2.

As shown in FIG. 2, the control apparatus 1 for the engine includes a control unit 49. The control unit 49 is an engine control unit (ECU). The control unit 49 is a well-known microcomputer-based controller. The control unit 49 includes a central processing unit (CPU), memory, and an I/F circuit. The CPU executes a program. The memory includes, for example, random access memory (RAM) and read only memory (ROM). The memory stores the program and data. The I/F circuit inputs/outputs an electric signal. The control unit 49 described herein may be implemented using computer programming or engineering techniques including computer software, firmware, hardware or any combination or subset thereof. For example, the control unit 49 may be non-transitory computer readable storage device having computer readable instructions that when executed by circuitry cause the circuitry to perform the methods described herein, may be circuits to perform the methods described herein, or a combination thereof.

The control unit 49 outputs a control signal to the throttle valve 29, the spark plug 47, and the injector 48.

The control apparatus 1 for the engine also has an accelerator opening angle sensor 55. The accelerator opening angle sensor 55 outputs, to the control unit 49, a signal that corresponds to a depression amount of the accelerator pedal operated by a driver.

The control apparatus 1 for the engine has a vehicle speed sensor 56. The vehicle speed sensor 56 outputs a signal corresponding to a vehicle speed of the automobile to the control unit 49.

The control apparatus 1 for the engine includes an oil temperature sensor 57. As shown in FIG. 1, the oil temperature sensor 57 is attached to the engine 2. The oil temperature sensor 57 outputs, to the control unit 49, a signal that corresponds to a temperature of the lubricating oil flowing through the oil gallery 44. In detail, the oil temperature sensor 57 is attached to the cylinder block 21 and measures the temperature of the lubricating oil supplied from the oil pan 46 to the cylinder head 25.

The control unit 49 includes, as functional blocks, a torque calculation unit 50, an intake air filling amount calculation unit 51, a fuel injection amount/timing calculation unit 52, an ignition timing calculation unit 53, and a storage unit 54.

The torque calculation unit 50 calculates target torque from target acceleration of the automobile on the basis of the measurement signals by the accelerator opening angle sensor 55 and the vehicle speed sensor 56.

The intake air filling amount calculation unit 51 calculates a target intake air filling amount for the cylinder 22 on the basis of the target torque. Although details will be described below, the intake air filling amount calculation unit 51 corrects the target intake air filling amount, which is set according to an operation amount of the accelerator pedal, on the basis of an upper limit value. The upper limit value is set according to the temperature of the lubricating oil.

The injection amount/timing calculation unit 52 calculates an injection amount and injection timing of the fuel on the basis of the corrected target intake air filling amount.

The ignition timing calculation unit 53 calculates ignition timing on the basis of the corrected target intake air filling amount.

Although details will be described below, the storage unit 54 stores a model equation and a plot 6 for setting an upper limit value qa_limit of the intake air filling amount.

(Control for Suppressing Distortion of Cylinder Head)

The control apparatus 1 for the engine is characterized by enabling suppression of thermal distortion of the cylinder head 25. The thermal distortion of the cylinder head 25 is caused by a temperature difference between a high-temperature portion having a high temperature and a low-temperature portion having a low temperature. The large temperature difference makes a deformation amount of the engine 2 non-uniform, and the non-uniformity of the deformation amount leads to the significant distortion.

FIG. 3 includes views showing the thermal distortion that occurs to the cylinder head 25. A left view of FIG. 3 is a plan view of the cylinder head 25, and a right view of FIG. 3 is a side view of the cylinder head 25.

For example, such a case is considered that, in environment where an outside air temperature falls below minus 20° C., the driver who has entered the automobile operates a starter switch to start the engine 2, the driver then depresses the accelerator pedal immediately after the start, and the automobile thereby travels while the throttle valve 29 is fully opened. In this case, the temperatures of positions of the exhaust port 27 formed in the cylinder head 25 and the exhaust manifold 36 are increased locally and rapidly. Shaded portions in FIG. 3 illustrate portions having a high temperature. Such a situation possibly occurs where, while an exhaust-side temperature of the cylinder head 25 is increased, the temperature away from the exhaust-side portion of the cylinder head 25, for example, near the upper end of the cylinder head 25 remains significantly lower than the extremely low outside air temperature. In this case, due to a large temperature difference, the cylinder head 25 is possibly and significantly distorted in a fan shape as indicated by blank arrows in FIG. 3.

Figure 4:
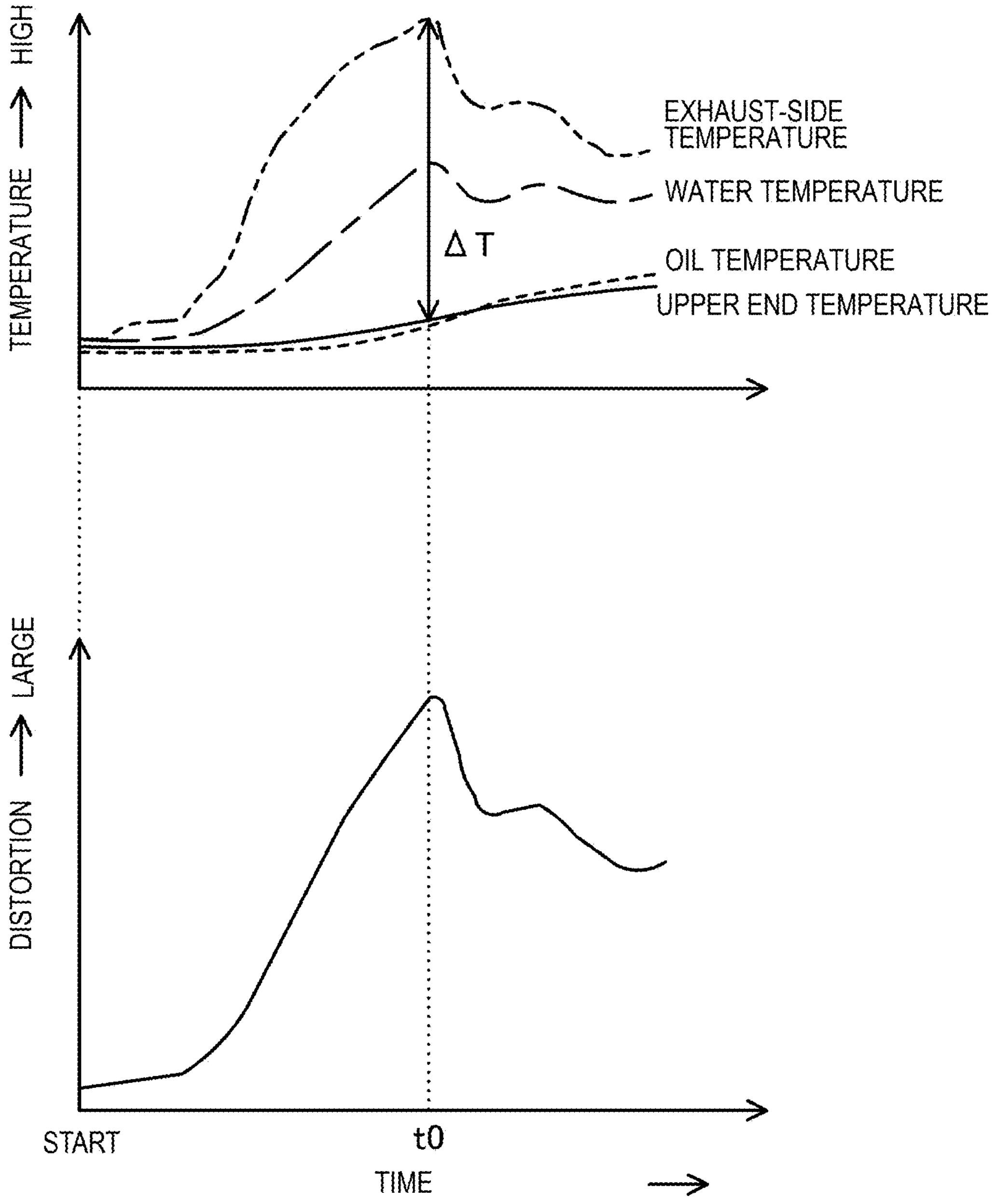
FIG. 4 shows time changes in various temperatures related to the engine and a change in the distortion corresponding to the time changes in the temperatures.

FIG. 4 illustrates time changes in various temperatures related to the engine 2 (i.e., a top view of FIG. 4) and a change in the distortion that occurs to the cylinder head 25 due to the temperature changes (i.e., a bottom view of FIG. 4) when the engine 2 is started in the environment at the extremely low temperature, and the engine 2 is then operated with the throttle valve 29 being substantially fully opened. In the top view of FIG. 4, a vertical axis represents the temperature, and a horizontal axis represents elapse of time. In the bottom view of FIG. 4, a vertical axis indicates the distortion, and a horizontal axis indicates the elapse of time.

Immediately after the start of the engine 2, the engine 2 is operated while the throttle valve 29 is fully opened. In conjunction therewith, as described above, the temperatures of the positions of the exhaust port 27 formed in the cylinder head 25 and the exhaust manifold 36, that is, the exhaust-side temperature is rapidly increased. The cooling water temperature of the engine 2 is gradually increased by following an increase in the exhaust-side temperature. However, an increase rate of the cooling water temperature of the engine 2 is lower than an increase rate of the exhaust-side temperature. When the thermostat valve for the cooling water is opened at specific timing, at time t0 in FIG. 4, the increase in the temperature of the cooling water in the engine 2 becomes gradual. After the time t0, the cooling water temperature of the engine 2 is maintained in a specific temperature range. When the thermostat valve is opened, the cooling water cooled by a radiator is supplied to the positions of the exhaust port 27 in the cylinder head 25 and the exhaust manifold 36. Thus, the exhaust-side temperature is gradually reduced.

Unlike the increase in the exhaust-side temperature, the temperature of the upper end of the cylinder head 25 is increased gradually. This is because the oil gallery 44 is located at the upper end of the cylinder head 25, and thus the upper end of the cylinder head 25 is cooled by the low-temperature lubricating oil. Since the temperature of the upper end of the cylinder head 25 gradually increases, a temperature difference ΔT between the exhaust-side temperature and the upper end temperature of the cylinder head 25 gradually increases after the start of the engine 2. The temperature difference ΔT is maximized at timing immediately before the exhaust-side temperature starts reduced.

As shown in the bottom view of FIG. 4, the distortion of the cylinder head 25 gradually increases with the increase in the exhaust-side temperature after the start of the engine 2. At timing when the temperature difference ΔT is maximized, the distortion is maximized.

After the distortion of the cylinder head 25 is maximized, the temperature difference ΔT is gradually reduced due to the reduction in the exhaust-side temperature and the increase in the upper end temperature. The distortion of the cylinder head 25 is also gradually reduced.

Here, as shown in the top view of FIG. 4, after the engine 2 is started, the upper end temperature of the cylinder head 25 and the temperature of the lubricating oil, i.e., the oil temperature, are increased substantially in the same manner. When the oil temperature is measured instead of the upper end temperature of the cylinder head 25, the measured oil temperature can be substituted for the upper end temperature of the cylinder head 25.

Figure 5:
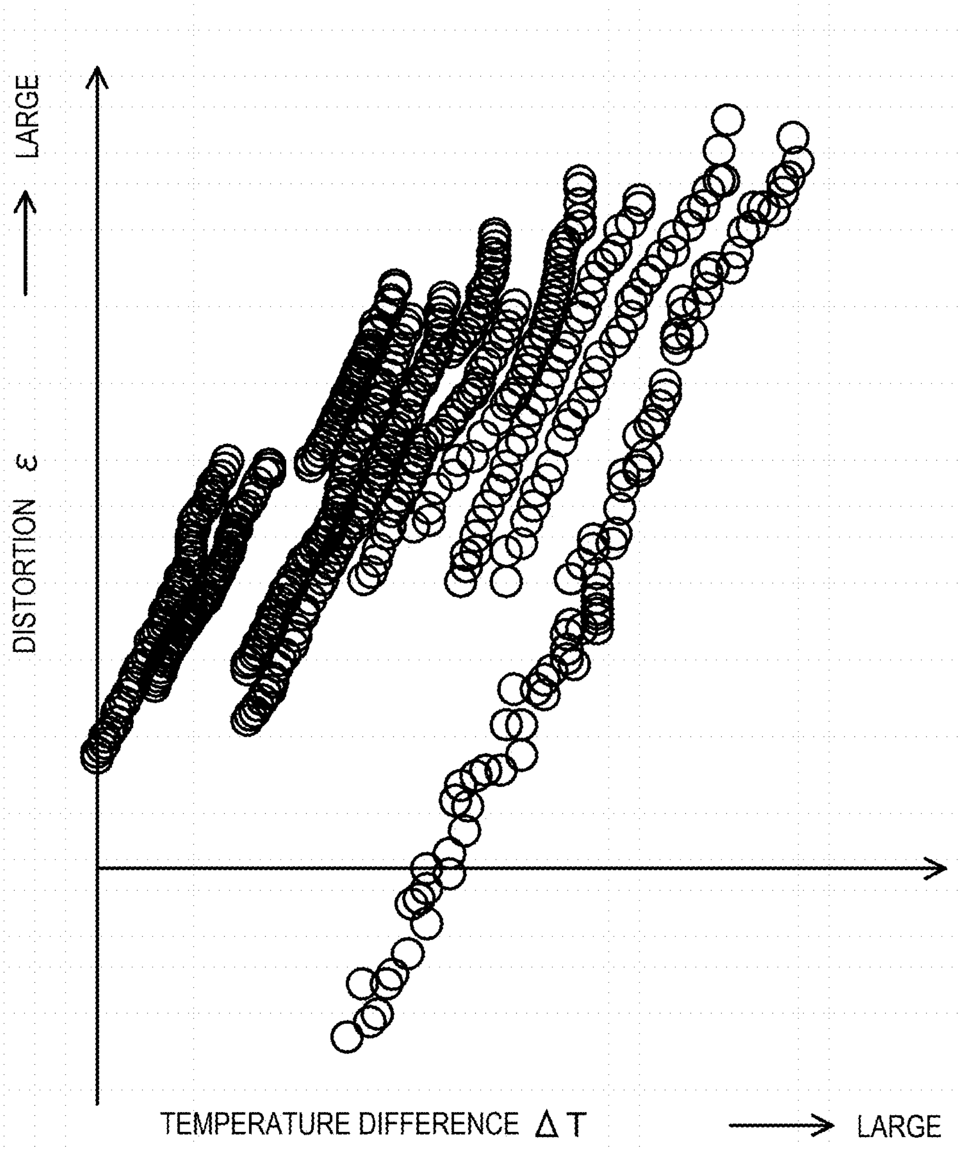
FIG. 5 shows a relationship between a temperature difference in the engine and the distortion.

From FIG. 4, it is considered that there is a correlation between the temperature difference ΔT between the exhaust-side temperature and the upper end temperature of the cylinder head 25 and the distortion occurring to the cylinder head 25. Thus, the inventors of the present application measured the temperature difference ΔT and a magnitude of the distortion of the cylinder head 25 in various operating states where a speed and/or a load of the engine 2 vary. FIG. 5 illustrates the measurement result. In FIG. 5, a vertical axis represents distortion c of the cylinder head 25, and a horizontal axis represents the temperature difference ΔT. It can be seen from FIG. 5 that the temperature difference ΔT and the distortion c in the cylinder head 25 have a linear relationship and that a magnitude of a slope a is substantially the same regardless of the operating state of the engine 2 while intercepts vary according to the operating state of the engine 2.

Based on FIG. 5, the inventors of the present application constructed a model for predicting the distortion c occurring to the cylinder head 25 from the temperature difference ΔT as shown in following Equations (3), (4).

$$\varepsilon = \Delta T \times a + f(qa) \tag{3}$$

$$\Delta T = \{\text{exhaust-side temperature } (qa, thw) - \text{upper end temperature } (\text{Toil}, thw, qa)\} \tag{4}$$

Here, qa is the intake air filling amount, thw is the cooling water temperature of the engine, and a is a constant (that is, the slope). Each of the intake air filling amount qa and the cooling water temperature thw is an influence factor of the exhaust-side temperature, and each of the intake air filling amount qa, the cooling water temperature thw, and the temperature Toil of the lubricating oil is an influence factor of the upper end temperature.

Even when suppression of the distortion of the cylinder head 25 by controlling the flow rate of the cooling water is attempted, as shown in FIG. 4, immediately after the start of the engine 2, the distortion of the cylinder head 25 is maximized before the distortion of the cylinder head 25 is suppressed by the cooling water. Therefore, flow rate control of the cooling water is not effective in suppressing the distortion of the cylinder head 25 immediately after the start of the engine 2.

Therefore, the control apparatus 1 for the engine suppresses the distortion of the cylinder head 25 by adjusting the intake air filling amount. That is, the control apparatus 1 for the engine relatively reduces the intake air filling amount even when the driver depresses the accelerator pedal. The limitation on the intake air filling amount suppresses the increase in the exhaust-side temperature. The suppression of the increase in the exhaust-side temperature suppresses the increase in the temperature difference ΔT and the distortion of the cylinder head 25.

More specifically, in the distortion model of Expressions (3), (4), the upper limit value qa_limit of the intake air filling amount is determined such that the distortion ε of the cylinder head 25 is suppressed to be equal to or less than an allowable value ε_a even when the cooling water temperature thw reaches a maximum temperature, for example, 100° C. In Expressions (3), (4), the allowable value ε_a is plugged in for the distortion c, 100° C. is plugged in for the cooling water temperature thw, the upper limit value qa_limit is plugged in for the intake air filling amount qa. Then, the upper limit value qa_limit of the intake air filling amount is expressed by using the temperature Toil of the lubricating oil to obtain following Expression (5).

$$qa\_limit = A \times \text{Toil} + B \times \varepsilon\_a + C \tag{5}$$

Here, A, B, and C are constants.

The control unit 49 determines the target intake air filling amount on the basis of the temperature Toil of the lubricating oil measured by the oil temperature sensor 57 and the measurement values measured by the accelerator opening angle sensor 55 and the vehicle speed sensor 56 by using Equation (5). In detail, the target intake air filling amount is set by limiting the target intake air filling amount, which is based on the measurement values measured by the accelerator opening angle sensor 55 and the vehicle speed sensor 56, by the upper limit value qa_limit of the intake air filling amount calculated by using Equation (5).

The intake air filling amount is limited even when the driver depresses the accelerator pedal. Thus, the increase in the exhaust-side temperature is suppressed. The increase in the temperature difference ΔT of the cylinder head 25 is suppressed. The distortion of the cylinder head 25 does not exceed the allowable value ε_a. Thus, the increase in the distortion of the cylinder head 25 is suppressed.

When the depression amount of the accelerator pedal by the driver is small, and the target intake air filling amount is not limited by the upper limit value of the intake air filling amount, the output of the engine 2 satisfies output requested by the driver.

Here, the allowable value ε_a of the distortion of the cylinder head 25 may be set as a predetermined value that is as large as possible within a range where no crack occurs to the cylinder head 25. This is because the larger allowable value ε_a of the distortion relaxes the limit on the upper limit value of the intake air filling amount more, and the output of the engine 2 approaches the output requested by the driver. The technique disclosed herein and using the model for predicting the distortion c that occurs to the cylinder head 25 achieves, at a high level, both the suppression of the distortion of the cylinder head 25 to be equal to or less than the allowable value and relaxation of the output limit on the engine 2 as much as possible.

The allowable value ε_a of the distortion of the cylinder head 25 may be set in consideration of residual distortion during manufacturing of the cylinder head 25 and the thermal distortion thereof.

According to Equation (5), in the case where the temperature Toil of the lubricating oil is increased as the operation of the engine 2 continues after the start of the engine 2, the upper limit value qa_limit of the intake air filling amount is increased. The increase in the upper limit value qa_limit relaxes the limit on the intake air filling amount when the driver depresses the accelerator pedal significantly. The output of the engine 2 is relatively increased. When the temperature Toil of the lubricating oil is high, the upper end temperature of the cylinder head 25 is high. Thus, the temperature difference ΔT between the exhaust-side temperature and the upper end temperature is small even when the output of the engine 2 is increased, and thus the exhaust-side temperature is increased.

Here, Equation (5) is an equation that is obtained by plugging in the maximum temperature for the cooling water temperature thw of the engine in Equations (3), (4). The actual cooling water temperature at the start of the engine 2 is lower than the maximum temperature. Accordingly, the upper limit value qa_limit of the intake air filling amount calculated using Equation (5) may be too small in consideration of the actual cooling water temperature of the engine 2, and the use of Equation (5) immediately after the start of the engine 2 may limit the output of the engine 2 more than necessary.

Figure 6:
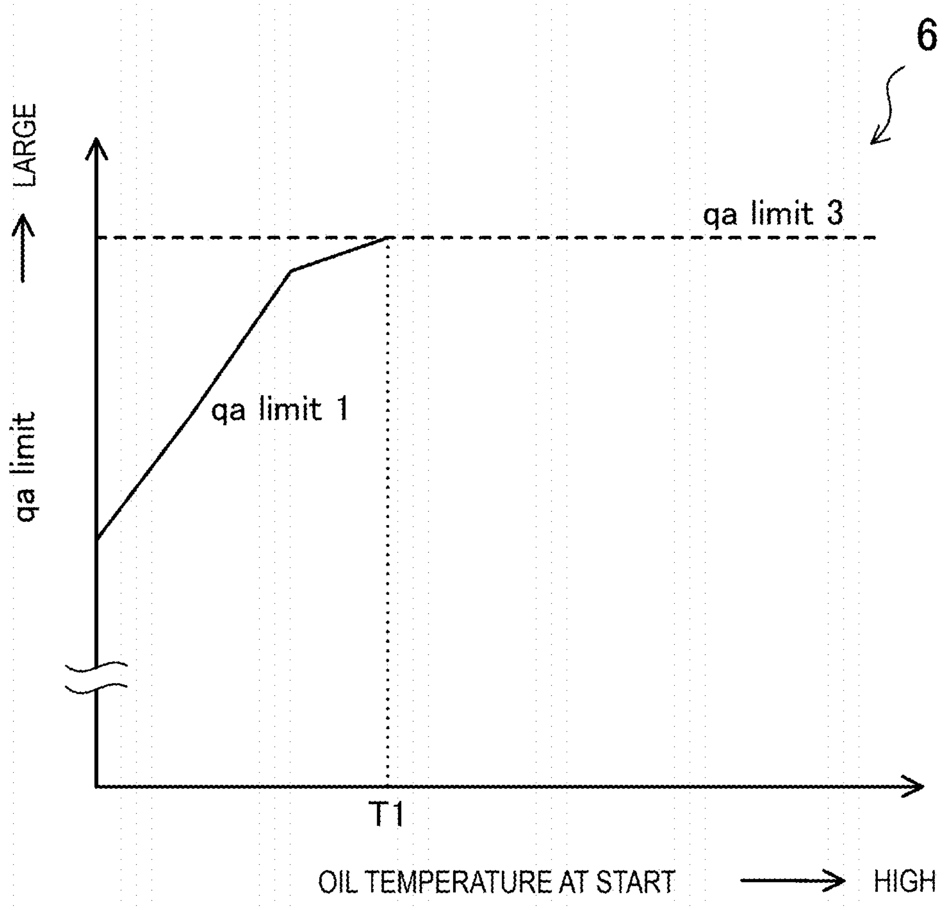
FIG. 6 illustrates a relationship for setting a first upper limit value of an intake air filling amount.

Therefore, immediately after the start of the engine 2, the control apparatus 1 for the engine sets a first upper limit value of the intake air filling amount by using the plot 6 shown in FIG. 6 instead of using Expression (5). Alternatively, the plot 6 may be represented as a table.

Plot 6 in FIG. 6 shows a relationship between the temperature of the lubricating oil at the start of the engine 2 (that is, a starting oil temperature) and the upper limit value of the intake air filling amount (that is, a first upper limit value qa_limit 1). The temperature of the lubricating oil may be equal to the upper end temperature of the cylinder head 25. The plot 6 is created on the basis of an experiment performed in advance. In FIG. 6, qa_limit 3 indicates an upper limit value of the intake air filling amount that determines maximum output in the specifications of the engine 2, that is, a third upper limit value. The third upper limit value is a fixed value determined for the engine 2. The first upper limit value qa_limit 1 is smaller than the third upper limit value qa_limit 3.

As indicated by a solid line in the plot 6, the first upper limit value qa_limit 1 of the intake air filling amount is set when the starting oil temperature is equal to or lower than Ti. The temperature Ti corresponds to the temperature of the lubricating oil at the start of the engine 2 at the extremely low outside air temperature. Ti may be set to a temperature of about 20 to 30° C. below a freezing point, for example. When the temperature of the lubricating oil at the start of the engine 2 exceeds Ti, the first upper limit value qa_limit 1 of the intake air filling amount is not set. Although details will be described below, when the first upper limit value qa_limit 1 of the intake air filling amount is not set, the upper limit value of the intake air filling amount using Equation (5), that is, the second upper limit value qa_limit 2 is not set, either.

In the plot 6, the first upper limit value qa_limit 1 of the intake air filling amount is set to be smaller as the starting oil temperature is reduced. This is because the upper end temperature of the cylinder head 25 is reduced as the starting oil temperature is reduced, and thus it is necessary to reduce the intake air filling amount in order to suppress the temperature difference in the cylinder head 25. A minimum value of the first upper limit value qa_limit 1 may be, for example, about 70% of the third upper limit value. That is, the output of the engine 2 may be reduced by up to about 30% of the maximum output.

Figure 7:
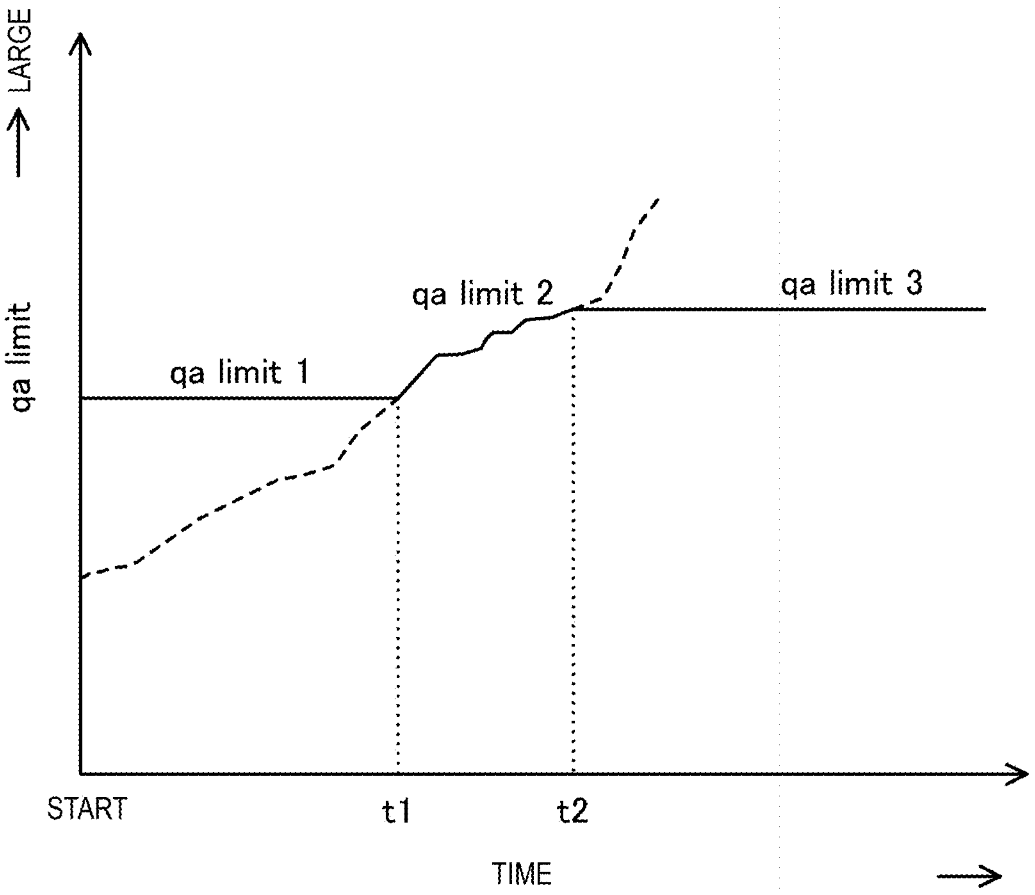
FIG. 7 illustrates a change in the upper limit value of the intake air filling amount after a start of the engine.

Next, setting of the upper limit value of the intake air filling amount by the control unit 49 will be described with reference to FIG. 7. In FIG. 7, a vertical axis represents the upper limit value qa_limit of the intake air filling amount, and a horizontal axis represents the elapse of time. FIG. 7 illustrates a change in the upper limit value of the intake air filling amount after the engine 2 is started.

At the start of the engine 2, the control unit 49 determines the first upper limit value qa_limit 1 of the intake air filling amount by using the plot 6, and sets the target intake air filling amount by limiting the target intake air filling amount, which is based on the measurement values measured by the accelerator opening angle sensor 55 and the vehicle speed sensor 56, by the first upper limit value qa_limit 1 of the intake air filling amount. As shown in FIG. 7, the first upper limit value qa_limit 1 of the intake air filling amount is a constant value.

After the start of the engine 2, the control unit 49 also calculates the second upper limit value qa_limit 2 of the intake air filling amount by using Equation (5) while the engine 2 continues to be operated. The second upper limit value qa_limit 2 is increased when the operation of the engine 2 continues and the temperature Toil of the lubricating oil is increased. The control unit 49 compares the first upper limit value qa_limit 1, which is set at the start of the engine 2, with the second upper limit value qa_limit 2 of the intake air filling amount, which is updated by using Expression (5). As shown by a broken line in FIG. 7, the second upper limit value qa_limit 2 of the intake air filling amount calculated by using Equation (5) is smaller than the first upper limit value qa_limit 1 in a period from the start of the engine 2 to time t1. Immediately after the start of the engine 2, the second upper limit value qa_limit 2 of the intake air filling amount may limit the intake air filling amount more than unnecessary.

At the time t1, when the second upper limit value qa_limit 2 of the intake air filling amount exceeds the first upper limit value qa_limit 1, the control unit 49 switches the upper limit value qa_limit of the intake air filling amount from the first upper limit value qa_limit 1 to the second upper limit value qa_limit 2.

Also after the time t1 in FIG. 7, the control unit 49 calculates the second value upper limit value qa_limit 2 of the intake air filling amount by using Equation (5). As the temperature of the lubricating oil is increased, the second upper limit value qa_limit 2 is gradually increased. As warm-up of the engine 2 progresses, the limit on the output of the engine 2 is relaxed.

As the temperature of the engine 2 is further increased over time, the second upper limit value qa_limit 2 of the intake air filling amount, which is calculated by using Equation (5), is further increased. As indicated by a broken line in FIG. 7, the second upper limit value qa_limit 2 of the intake air filling amount exceeds the third upper limit value qa_limit 3 (see time t2 in FIG. 7). As described above, the third upper limit value qa_limit 3 of the intake air filling amount is the upper limit value of the intake air filling amount that determines the maximum output in the specifications of the engine 2, and is a fixed value determined for the engine 2. After the second upper limit value qa_limit 2 of the intake air filling amount exceeds the third upper limit value qa_limit 3, the control unit 49 sets the target intake air filling amount by using the third upper limit value qa_limit 3. The intake air filling amount of the engine 2 is no longer substantially limited. The second upper limit value qa_limit 2 is smaller than the third upper limit value qa_limit 3.

(Engine Control)

Next, the control for the engine 2 including adjustment control of the intake air filling amount for suppressing the distortion of the cylinder head 25 described above will be described with reference to the drawings.

Figure 8:
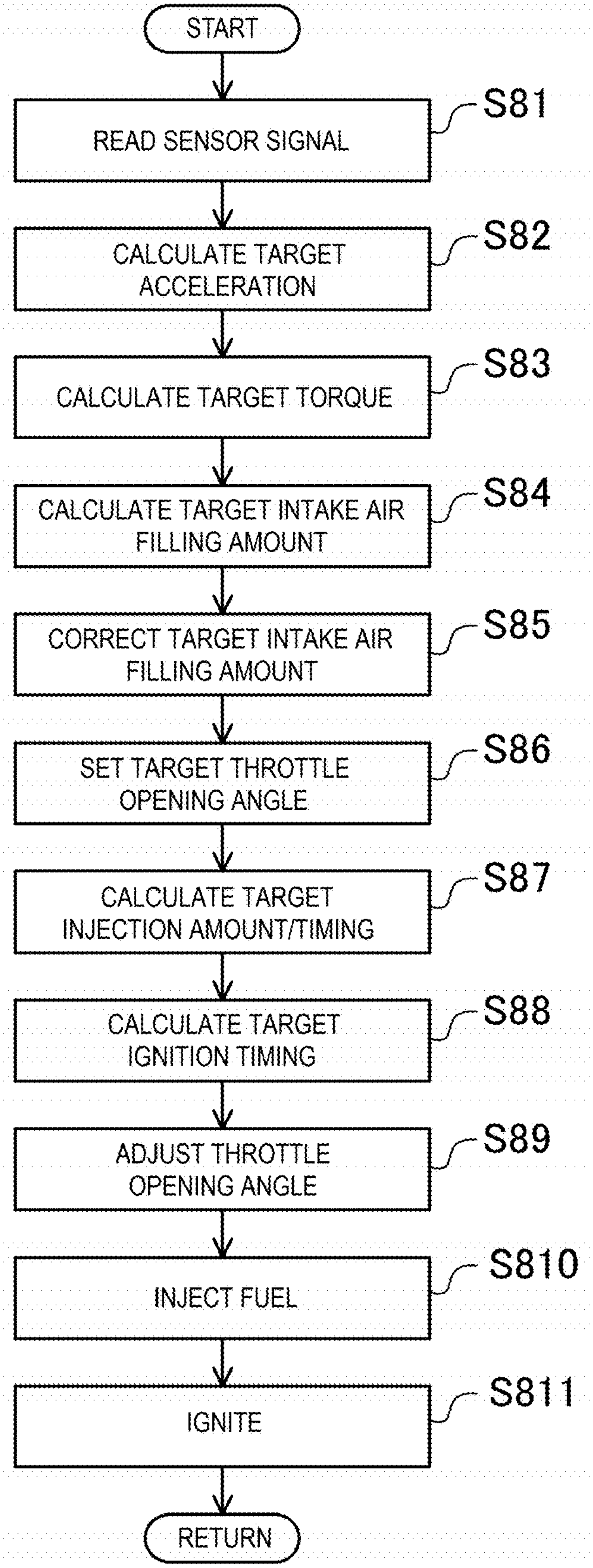
FIG. 8 is a flowchart of basic control for the engine.

FIG. 8 shows a flowchart of basic control for the engine 2. The flowchart of FIG. 8 is executed by the control unit 49. In step S81 after a start, the control unit 49 reads the measurement signals by the respective sensors. In subsequent step S82, the control unit 49 calculates the target acceleration of the automobile on the basis of the measurement signals by the accelerator opening angle sensor 55 and the vehicle speed sensor 56. In step S83, the control unit 49 calculates the target torque from the target acceleration. In subsequent step S84, the control unit 49 calculates the target intake air filling amount from the target torque. The target intake air filling amount calculated in S84 is the target intake air filling amount that corresponds to the operation amount of the accelerator pedal by the driver.

In step S85, the control unit 49 corrects the target intake air filling amount from the target intake air filling amount calculated in step S84 and the upper limit value qa_limit of the intake air filling amount. That is, when the target intake air filling amount calculated in step S84 exceeds the upper limit value qa_limit of the intake air filling amount, the control unit 49 sets the upper limit value qa_limit of the intake air filling amount to the target intake air filling amount. When the driver depresses the accelerator pedal significantly, the intake air filling amount is limited. When the target intake air filling amount calculated in step S84 is equal to or smaller than the upper limit value qa_limit of the intake air filling amount, the control unit 49 sets the target intake air filling amount, which is calculated in step S84, as it is to the target intake air filling amount.

In step S86, the control unit 49 sets a target throttle opening angle on the basis of the corrected target intake air filling amount. In step S87, the control unit 49 also calculates a target injection amount/injection timing. In step S88, the control unit 49 calculates the target ignition timing.

In step S89, the control unit 49 adjusts the opening angle of the throttle valve 29 so as to obtain the throttle opening angle set in step S86. In step S810, the control unit 49 causes the injector 48 to inject the fuel on the basis of the target injection amount/injection timing calculated in step S87. In step S811, the control unit 49 causes the spark plug 47 to ignite at the target ignition timing set in step S88.

Figure 9:
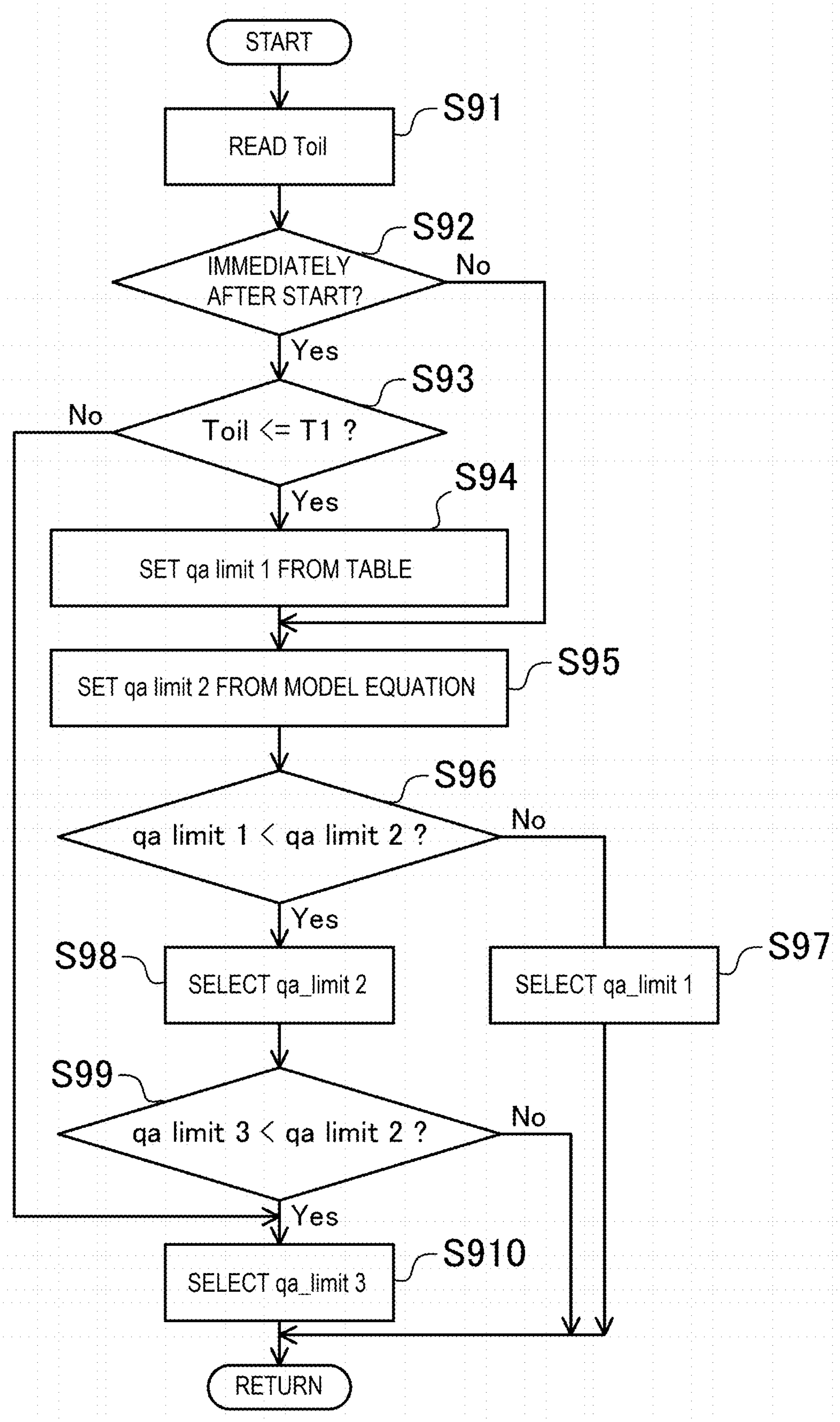
FIG. 9 shows a procedure for setting the upper limit value of the intake air filling amount.

FIG. 9 is a flowchart showing a procedure for setting the upper limit value of the intake air filling amount. The upper limit value qa_limit of the intake air filling amount set in FIG. 9 is used in step S85 of the flow in FIG. 8.

First, in step S91 after the start, the control unit 49 reads the measurement signal of the oil temperature sensor 57. In subsequent step S92, the control unit 49 determines whether current time is immediately after the start of the engine 2. If the current time is immediately after the start, the process in FIG. 9 proceeds to step S93. If not, the process in FIG. 9 proceeds to step S95.

In step S93, the control unit 49 determines whether the temperature Toil of the lubricating oil is equal to or lower than Ti (see also FIG. 6). If the determination in step S93 is No, the process proceeds to step S910. This is because, since the temperature Toil of the lubricating oil at the start of the engine 2 is relatively high, the distortion caused by the above-described temperature difference ΔT is not increased. The control unit 49 selects the third upper limit value qa_limit 3 as the upper limit value of the intake air filling amount. Neither the first upper limit value qa_limit 1 nor the second upper limit value qa_limit 2 is set.

If the determination in step S93 is Yes, the process in FIG. 9 proceeds to step S94. In step S94, the control unit 49 uses the plot 6 in FIG. 6 to set the first upper limit value qa_limit 1 from the temperature Toil of the lubricating oil.

In subsequent step S95, the control unit 94 uses the model equation of Equation (5) to set the second upper limit value qa_limit 2 from the temperature Toil of the lubricating oil.

In step S96, the control unit 49 determines whether the second upper limit value qa_limit 2 is larger than the first upper limit value qa_limit 1. When the second upper limit value qa_limit 2 is equal to or smaller than the first upper limit value qa_limit 1, the process in FIG. 9 proceeds to step S97, and the control unit 49 selects the first upper limit value qa_limit 1 as the upper limit value of the intake air filling amount. This corresponds to the period from the start of the engine 2 to the time t1 in FIG. 7.

If the second upper limit value qa_limit 2 exceeds the first upper limit value qa_limit 1, the process in FIG. 9 proceeds from step S96 to step S98, and the control unit 49 selects the second upper limit value qa_limit 2 as the upper limit value of the intake air filling amount. This corresponds to the period after time t1 in FIG. 7.

In step S99 after step S98, the control unit 49 determines whether the second upper limit value qa_limit 2 is larger than the third upper limit value qa_limit 3. If the second upper limit value qa_limit 2 is smaller than the third upper limit qa_limit 3, the process in FIG. 9 returns. The control unit 49 selects the second upper limit value qa_limit 2 as the upper limit value of the intake air filling amount. This corresponds to a period from time t1 to time t2 in FIG. 7.

If the second upper limit value qa_limit 2 exceeds the third upper limit value qa_limit 3, the process in FIG. 9 proceeds to step S910. The control unit 49 selects the third upper limit value qa_limit 3 as the upper limit value of the intake air filling amount. This corresponds to a period after time t2 in FIG. 7.

The control apparatus 1 for the engine sets the upper limit value qa_limit 1 or qa_limit 2 of the intake air filling amount in advance according to the temperature Toil of the lubricating oil at the start of the engine 2, in other words, before the temperature difference ΔT between the upper end temperature of the cylinder head 25 and the exhaust-side temperature is increased, and limits the target intake air filling amount as needed.

Here, unlike the control apparatus described above, such control is considered that, after the temperature difference ΔT between the upper end temperature of the cylinder head 25 and the exhaust-side temperature is increased during the operation of the engine 2, the upper limit value qa_limit of the intake air filling amount is set to limit the intake air filling amount. In this case, the temperature difference ΔT between the upper end temperature of the cylinder head 25 and the exhaust-side temperature is not large immediately after the start of the engine 2. Thus, while the target intake air filling amount is not substantially limited, as described above, the exhaust-side temperature is rapidly increased, and the temperature difference ΔT between the upper end temperature of the cylinder head 25 and the exhaust-side temperature is increased when such operation of the engine 2 continues that the accelerator pedal is depressed and the throttle valve 29 is fully opened. The second upper limit value qa_limit 2 is thereby set, for example. As a result, the target intake air filling amount may be limited by the set upper limit value. This control limits the output of the engine 2 as the temperature of the engine 2 is increased, and causes the driver to have a sense of discomfort.

On the other hand, the above-described control apparatus 1 for the engine sets the upper limit value qa_limit of the intake air filling amount in advance before the temperature difference ΔT between the upper end temperature of the cylinder head 25 and the exhaust-side temperature is increased, and limits the target intake air filling amount. As illustrated in FIG. 7, the upper limit value qa_limit of the intake air filling amount is gradually increased. That is, as the warm-up of the engine 2 progresses, the limit on the target intake air filling amount is relaxed, so that the output of the engine 2 approaches the output requested by the driver. As a result, the driver is prevented from having the sense of discomfort.

Further, the control apparatus 1 for the engine does not suppress the distortion of the engine 2 by increasing cooling capacity of the engine 2, and thus has an advantage that the temperature difference of the engine 2 can be effectively suppressed immediately after the start of the engine 2.

Furthermore, the control apparatus 1 for the engine executes the above-described distortion suppression control for the engine 2 using the oil temperature sensor 57. The control apparatus 1 for the engine does not require any special sensor. Note that the technique disclosed herein does not exclude the use of a sensor other than the oil temperature sensor 57. The temperature difference of the cylinder head 25 can be determined on the basis of various parameters related to the operation of the engine.

Note that the technique disclosed herein is not limited to the application to the above-described engine. The technique disclosed herein can be applied to various engines.

REFERENCE SIGNS LIST

1: control apparatus for engine
2: engine
22: cylinder
25: cylinder head
26: intake port
27: exhaust port
29: throttle valve (adjustment unit)
44: oil gallery (passage)
49: control unit
57: oil temperature sensor (measurement unit)
6: plot

The invention claimed is:

1. A control system for an engine comprising:

a valve configured to adjust an intake air filling amount for a cylinder according to an operation amount of an accelerator pedal;

a sensor configured to output a measurement signal related to a temperature of an upper end of a cylinder head having an intake port and an exhaust port communicating with the cylinder; and a control circuit configured to set an upper limit value of the intake air filling amount to decrease as the temperature of the upper end of the cylinder head decreases based on the measurement signal of the sensor at a start of an engine, and output, to the valve, a control signal corresponding to the operation amount of the accelerator pedal within a range where the intake air filling amount does not exceed the upper limit value, wherein the cylinder head has a lubricating oil passage at the upper end of the cylinder the sensor is attached to the engine and outputs a measurement signal related head, to a temperature of lubricating oil in the lubricating oil passage to the control circuit, the control circuit is configured to set an upper limit value ga limit of the intake air filling amount according to the following relational expression, $$qa\ \text{limit} = A \times \text{Toil} + B \times \varepsilon\ \ a + C$$

where Toil is the temperature of lubricating oil, ε_a is a predetermined value of distortion of the cylinder head, and A, B, and C are constants, retrieve a relationship between the temperature of the upper end of the cylinder head at the start of the engine and the upper limit value of the intake air filling amount, set a first upper limit value of the intake air filling amount based on the measurement signal of the sensor by using the relationship at the start of the engine, output a first control signal corresponding to the operation amount of the accelerator pedal within a range where the intake air filling amount does not exceed the first upper limit value, calculate a second upper limit value of the intake air filling amount by using the relational expression after the start of the engine, compare the second upper limit value and the first upper limit value, and in response to the second upper limit value exceeding the first upper limit value, output, to the valve, a second control signal corresponding to the operation amount of the accelerator pedal within a range where the intake air filling amount does not exceed the second upper limit value.

2. The control system for the engine according to claim 1, wherein the control circuit is configured to compare the temperature to a predetermined temperature, in response to the temperature being less than or equal to the predetermined temperature, proceed to retrieve the relationship, and otherwise, set a predetermined value of the intake air filling amount as the upper limit value, and output a control signal corresponding to the operation amount of the accelerator pedal within a range where the intake air filling amount does not exceed the predetermined value of the intake air filling amount.

3. The control system for the engine according to claim 2, wherein the control circuit is configured to compare the second upper limit value to the predetermined value of the intake air filling amount, set the predetermined value of the intake air filling amount as the upper limit, and output a control signal corresponding to the operation amount of the accelerator pedal within a range where the intake air filling amount does not exceed the predetermined value of the intake air filling amount.

4. The control system for the engine according to claim 1, wherein the control circuit is configured to compare the second upper limit value to a predetermined value of the intake air filling amount, in response to the second upper limit value being less than the predetermined value, set the predetermined value of the intake air filling amount as the upper limit, and output a control signal corresponding to the operation amount of the accelerator pedal within a range where the intake air filling amount does not exceed the predetermined value of the intake air filling amount.

5. A control system for an engine, comprising:

a valve configured to adjust an intake air filling amount for a cylinder according to an operation amount of an accelerator pedal;

a sensor configured to output a measurement signal related to a temperature of an upper end of a cylinder head having an intake port and an exhaust port communicating with the cylinder; and a control circuit configured to set an upper limit value of the intake air filling amount to decrease as the temperature of the upper end of the cylinder head decreases based on the measurement signal of the sensor at a start of an engine, and output, to the valve, a control signal corresponding to the operation amount of the accelerator pedal within a range where the intake air filling amount does not exceed the upper limit value, wherein the cylinder head has a lubricating oil passage at the upper end of the cylinder head, the sensor is attached to the engine and outputs a measurement signal related to a temperature of lubricating oil to the control circuit, the control circuit is configured to set an upper limit value qa_limit of the intake air filling amount according to the following relational expression, $$qa\ \text{limit} = A \times \text{Toil} + B \times \varepsilon\ \ a + C$$

where Toil is the temperature of lubricating oil, ε_a is a predetermined value of distortion of the cylinder head, and A, B, and C are constants, and the predetermined value of distortion is set as a value of distortion of the cylinder head in a range where no crack occurs to the cylinder head.

6. The control system for the engine according to claim 5, wherein the predetermined value of distortion is set as a maximum value of distortion in the range.

7. The control system for the engine according to claim 1, wherein the control circuit is configured to compare the temperature to a predetermined temperature, and in response to the temperature being less than or equal to the predetermined temperature, determine the start of the engine.

8. A control apparatus for an engine comprising:

a control circuit configured to set an upper limit value of an intake air filling amount to decrease as a temperature of an upper end of a cylinder head decreases based on a measurement signal received from a sensor a start of an engine, the cylinder head having a lubricating oil passage at the upper end of the cylinder head and having an intake port and an exhaust port communicating with a cylinder, the sensor being attached to the engine, the measurement signal being related to a temperature of lubricating oil in the lubricating oil passage;

output, to a valve configured to adjust an intake air filling amount for the cylinder according to an operation amount of an accelerator pedal, a control signal corresponding to the operation amount of the accelerator pedal within a range where the intake air filling amount does not exceed the upper limit value;

set an upper limit value of the intake air filling amount for a cylinder according to an operation amount of an accelerator pedal to decrease as the temperature of the upper end of the cylinder head decreases based on the measurement signal at a start of an engine; and set an upper limit value ga limit of the intake air filling amount according to the following relational expression, $$qa\ \text{limit} = A \times \text{Toil} + B \times \varepsilon\ \ a + C$$

where Toil is the temperature of lubricating oil, ε_a is a predetermined value of distortion of the cylinder head, and A, B, and C are constants, wherein the cylinder head has a lubricating oil passage at the upper end of the cylinder head, the sensor is attached to the engine and outputs a measurement signal related to a temperature of lubricating oil to the control circuit, and the predetermined value of distortion is set as a value of distortion of the cylinder head in a range where no crack occurs to the cylinder head.

9. The control apparatus for the engine according to claim 8, wherein the control circuit is configured to set an upper limit value qa_limit of the intake air filling amount according to the following relational expression, $$\text{qa\_limit} = A \times \text{Toil} + B \times \varepsilon\text{\_a} + C$$

where Toil is the temperature of lubricating oil, ε_a is a predetermined value of distortion of the cylinder head, and A, B, and C are constants.

10. The control apparatus for the engine according to claim 9, wherein, to set the upper limit value and output the control signal, the control circuit is configured to:

retrieve a relationship between the temperature of the upper end of the cylinder head at a start of the engine and the upper limit value of the intake air filling amount, set a first upper limit value of the intake air filling amount based on the measurement signal of the sensor by using the relationship at the start of the engine, output, to the valve, a first control signal corresponding to the operation amount of the accelerator pedal within a range where the intake air filling amount does not exceed the first upper limit value, calculate a second upper limit value of the intake air filling amount by using the relational expression after the start of the engine, compare the second upper limit value and the first upper limit value, and in response to the second upper limit value exceeding the first upper limit value, output, to the valve, a second control signal corresponding to the operation amount of the accelerator pedal within a range where the intake air filling amount does not exceed the second upper limit value.

11. The control apparatus for the engine according to claim 10, wherein the control circuit is configured to compare a temperature of the lubricating oil to a threshold, in response to the temperature of the lubricating oil being less than or equal to the threshold, proceed to retrieve the relationship, and otherwise, set a predetermined value of the intake air filling amount as the upper limit value, and output a control signal corresponding to the operation amount of the accelerator pedal within a range where the intake air filling amount does not exceed the predetermined value of the intake air filling amount.

12. The control apparatus for the engine according to claim 11, wherein the control circuit is configured to compare the second upper limit value to the predetermined value of the intake air filling amount, set the predetermined value of the intake air filling amount as the upper limit, and output a control signal corresponding to the operation amount of the accelerator pedal within a range where the intake air filling amount does not exceed the predetermined value of the intake air filling amount.

13. The control apparatus for the engine according to claim 10, wherein the control circuit is configured to compare the second upper limit value to a predetermined value of the intake air filling amount, set the predetermined value of the intake air filling amount as the upper limit, and output a control signal corresponding to the operation amount of the accelerator pedal within a range where the intake air filling amount does not exceed the predetermined value of the intake air filling amount.

14. The control apparatus for the engine according to claim 8, wherein the control circuit is configured to compare the temperature to a predetermined temperature, and in response to the temperature being less than or equal to the predetermined temperature, determine the start of the engine.

15. A method of controlling an engine comprising, the method comprising:

setting an upper limit value of an intake air filling amount to decrease as a temperature of an upper end of a cylinder head decreases based on a measurement signal received from a sensor at a start of an engine, the cylinder head having a lubricating oil passage at the upper end of the cylinder head and having an intake port and an exhaust port communicating with a cylinder, the sensor is attached to the engine, the measurement signal being related to a temperature of lubricating oil in the lubricating oil passage; and outputting, to a valve configured to adjust an intake air filling amount for the cylinder according to an operation amount of an accelerator pedal, a control signal corresponding to the operation amount of the accelerator pedal within a range where the intake air filling amount does not exceed the upper limit value setting an upper limit value ga limit of the intake air filling amount according to the following relational expression, $$qa\ \text{limit} = A \times \text{Toil} + B \times \varepsilon\ \ a + C$$

where Toil is the temperature of lubricating oil, ε_a is a predetermined value of distortion of the cylinder head, and A, B, and C are constants, retrieving a relationship between the temperature of the upper end of the cylinder head at the start of the engine and the upper limit value of the intake air filling amount, setting a first upper limit value of the intake air filling amount based on the measurement signal of the sensor by using the relationship at the start of the engine, outputting a first control signal corresponding to the operation amount of the accelerator pedal within a range where the intake air filling amount does not exceed the first upper limit value, calculating a second upper limit value of the intake air filling amount by using the relational expression after the start of the engine, comparing the second upper limit value and the first upper limit value, and in response to the second upper limit value exceeding the first upper limit value, outputting, to the valve, a second control signal corresponding to the operation amount of the accelerator pedal within a range where the intake air filling amount does not exceed the second upper limit value.

16. A non-transitory computer readable storage device having computer readable instructions that when executed by circuitry cause the circuitry to perform the method of claim 15.

* * * * *